United States Patent
Kihira et al.

[11] Patent Number: 6,129,558
[45] Date of Patent: Oct. 10, 2000

[54] CONNECTOR FOR A PRINTED CIRCUIT BOARD AND A PRODUCTION METHOD THEREFOR

[75] Inventors: Satoru Kihira, Kawasaki; Masaaki Harasawa; Takayasu Onoda, both of Yokohama, all of Japan

[73] Assignee: Japan Solderless Terminal Mfg. Co., Ltd., Osaka, Japan

[21] Appl. No.: 09/221,545

[22] Filed: Dec. 28, 1998

[30] Foreign Application Priority Data

Dec. 26, 1997 [JP] Japan ..................................... 9-368391

[51] Int. Cl.⁷ ................................................. H01R 12/00
[52] U.S. Cl. ............................................. 439/66; 439/630
[58] Field of Search ................................. 439/66, 62, 64, 439/326, 630

[56] References Cited

U.S. PATENT DOCUMENTS

| | | | |
|---|---|---|---|
| 4,509,811 | 4/1985 | Amano et al. | 439/62 |
| 4,799,891 | 1/1989 | Reichardt et al. | 439/64 |
| 4,902,233 | 2/1990 | Maillot | 439/62 |
| 4,975,086 | 12/1990 | Reichardt et al. | 439/629 |
| 5,224,873 | 7/1993 | Duffet et al. | 439/326 |
| 5,257,414 | 10/1993 | Trahan et al. | 455/90 |
| 5,259,777 | 11/1993 | Schuder et al. | 439/188 |
| 5,320,552 | 6/1994 | Reichardt et al. | 439/331 |
| 5,520,551 | 5/1996 | Broschard, III | 439/567 |
| 5,586,890 | 12/1996 | Braun | 439/66 |
| 5,655,917 | 8/1997 | Kaneshige et al. | 439/155 |
| 5,743,766 | 4/1998 | Kaneshige et al. | 439/630 |
| 5,746,607 | 5/1998 | Bricaud et al. | |
| 5,746,626 | 5/1998 | Kwiat et al. | 439/630 |
| 5,882,230 | 3/1999 | Bricaud et al. | 439/630 |
| 5,984,707 | 11/1999 | Kuwata | 439/326 |

FOREIGN PATENT DOCUMENTS

| | | |
|---|---|---|
| 0756355 | 1/1997 | European Pat. Off. . |
| 7-22105 | 1/1995 | Japan . |
| 8-321353 | 12/1996 | Japan . |

*Primary Examiner*—Brian Sircus
*Assistant Examiner*—T. C. Patel
*Attorney, Agent, or Firm*—W. F. Fasse; W. G. Fasse

[57] ABSTRACT

A connector for a printed circuit board including a board-shaped housing with windows and connecting terminals arranged for the windows. An intermediate part of each connecting terminal is fixed to a housing part at an edge of the window, and a contacting part of the connecting terminal is arranged so that it can undergo elastic deformation in the window in the direction of thickness of the housing near the top of the housing. The external end of the connecting terminal is formed as a lead, and the connecting terminal is provided with a reinforcing lead that extends from the intermediate part toward the bottom of the housing in the window. If necessary, a reinforcing frame is embedded in the housing. A production method thereof is indicated by example, wherein connecting terminals and a frame being connected together are press-formed, and they are integrally molded with the housing, then the connecting terminals and the frame are disconnected from the rest.

5 Claims, 6 Drawing Sheets

CONNECTOR FOR A PRINTED CIRCUIT BOARD AND A PRODUCTION METHOD THEREFOR

BACKGROUND OF THE INVENTION

1. Field of the Invention

The present invention relates to improvements in a connector for a printed circuit board that is used to connect, for example, two printed circuit boards or a printed circuit board and an SIM card, etc.

2. Related Art

Up to the present, for example, a connector shown in FIG. 10A and FIG. 10B has been known as a connector of this kind. It comprises a board-shaped housing 51 with receiving holes 52 and connecting terminals 53 arranged in these receiving holes 52 (for example, refer to Japanese Provisional Patent Hei 8-321353). Each connecting terminal 53 has an intermediate part 53a that is fixed to the housing near the edge of the receiving hole. The internal end of the connecting terminal 53 is bent into the shape of an inverted V to form a contacting part 53b. The external end of the terminal 53 extends out of the housing 51 to form a lead 53c. This connector is surface-mounted on a printed circuit board 54 by the above-mentioned leads 53c. The above-mentioned contacting parts 53b undergo elastic deformation in the direction of thickness of the housing (the vertical direction in FIG. 10B) to be pressed against and contact contacting parts of a counterpart such as a printed circuit board and an SIM card. In this way, the connector establishes mechanical connection and electric connection between two printed circuit boards (hereinafter referred to as board to board connection) or between a printed circuit board and an SIM card or the like (hereinafter referred to as board to card connection). In the present specification, an SIM card or the like includes SIM card, PC card and IC card.

In such a connector, a pressing contact force given by a counterpart 55 such as a printed circuit board or an SIM card or the like is transmitted via the connecting terminal 53 to concentratedly work on a fixed part or a contact pact of the lead 53c and the housing 51 on the printed circuit board 54. However, when leads 53c are made smaller and thinner, concentrated stresses caused by the above-mentioned pressing contact forces tend to cause troubles, for example, cracks generated in a fixed part of a lead 53c on the printed circuit board 54 and resulting failure of connection. Moreover, as the housing 51 must have a sufficient strength, it is not easy to make the housing 51 smaller or thinner. This, in turn, hinders efforts of reducing the size of appliances that use a connector of this kind to make board to board connection or board to card connection.

SUMMARY OF THE INVENTION

One objective of the present invention is to provide a connector for a printed circuit board wherein connecting terminals are supported on a printed circuit board even inside the housing by means of reinforcing leads so as to lessen concentrated stresses exerted to the leads and the housing by pressing contact forces, prevent any damages to the leads, achieve reduction in size and thickness of the leads, achieve reduction in size and thickness of the housing, and in turn, achieve reduction in size of appliances using such a connector.

To accomplish the above-mentioned objective, a connector for a printed circuit board of the present invention comprises a board-shaped housing with windows, and connecting terminals that are arranged in relation with these windows, have an intermediate part fixed to a part of the housing at an edge of the window, have a contacting part being formed at the internal end and being formed so that it can undergo elastic deformation in the direction of thickness of the housing in the window near the top of the housing, have a lead formed at an external end, and have a reinforcing lead extending from the intermediate part towards the housing bottom in the window.

This connector is surface-mounted on a printed Circuit board by its leads. Its contacting parts undergo elastic deformation in the direction of thickness of the housing to be pressed against and contact contacting parts of a counterpart, printed circuit board or SIM card or the like. In this way, the connector establishes board to board or board to card mechanical connection and electric connection. The pressing contact forces that are exerted by the counterpart, printed circuit board or SIM card or the like, work, via the connecting terminals, on the fixed parts or contact parts of the leads of the connecting terminals and the housing on a printed circuit board. The pressing contact forces also work on the fixed parts or contact parts of the reinforcing leads on the printed circuit board, and by that portion, the concentrated stresses on the leads and the housing are reduced. This prevents damages to the leads, making it possible to reduce size or thickness of the leads, and in turn, to reduce size or thickness of the housing.

In the connector for a printed circuit board according to the present invention, connecting terminals are also supported on a printed circuit board on the window side by means of reinforcing leads. Because of this, the connector for a printed circuit board of the present invention reduces the concentrated stresses on the leads and the housing exerted by the pressing contact forces of the counterpart, printed circuit board or SIM card or the like, prevents damages to the leads and allow reduction in size and thickness of the leads, and in turn, promotes reduction in size and thickness of the housing. This makes it possible to reduce the size of appliances using the connector. In particular, the present invention is extremely effective in promoting reduction in size of portable appliances such as portable telephone and digital video camera recorder.

PREFERRED EMBODIMENT OF THE INVENTION

Figure 1:
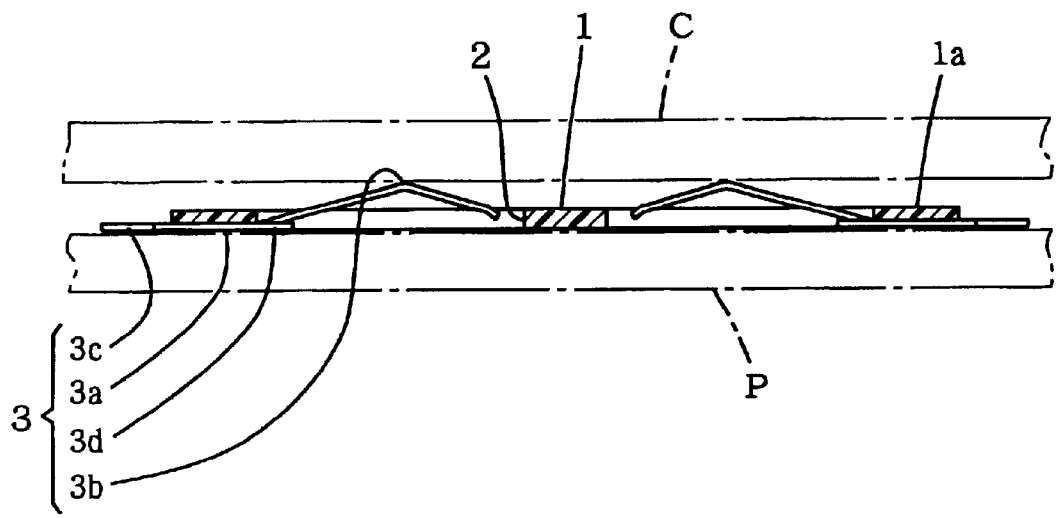
FIG. 1 is a sectional view along the line A—A of a connector for a printed circuit board of the first embodiment shown in FIG. 2.
Figure 2:
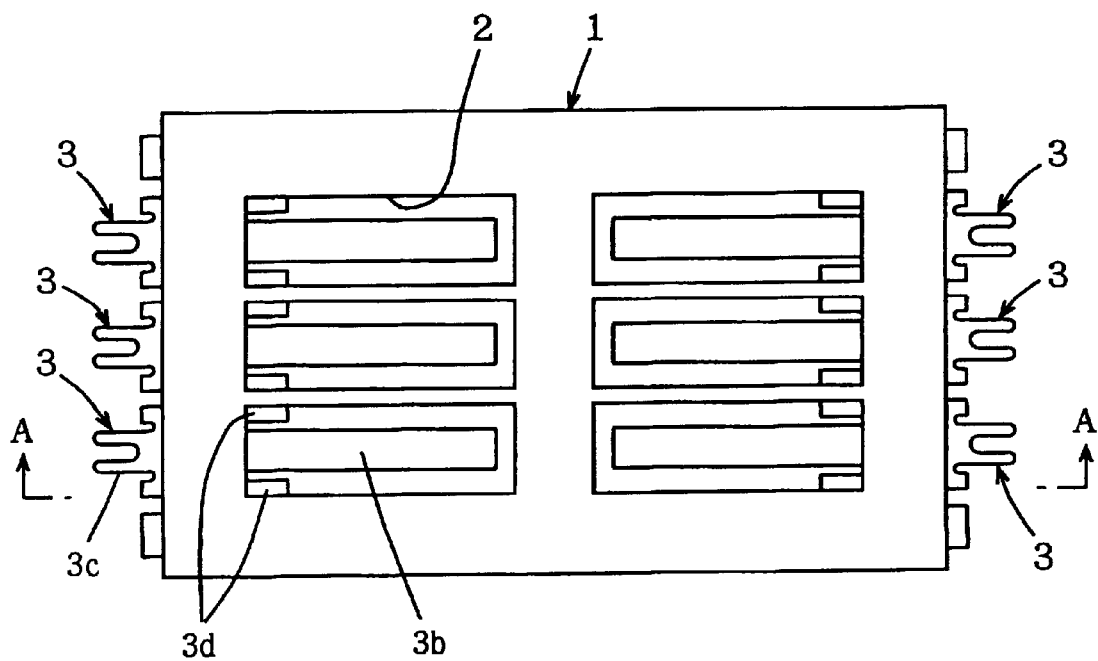
FIG. 2 is a plan view of the first embodiment.
Figure 3:
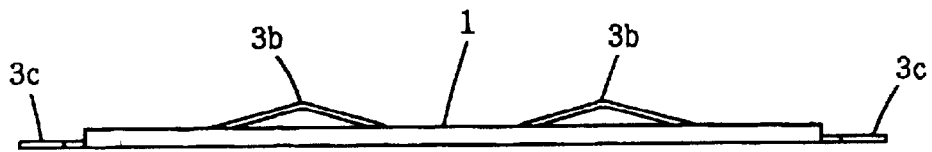
FIG. 3 is front view of the first embodiment.
Figure 4:
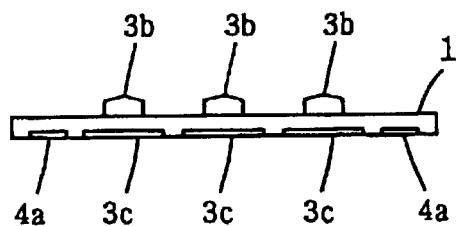
FIG. 4 is a left side view of the first embodiment.

In the following, some embodiments of the present invention will be described with reference to drawings. FIG. 1 through FIG. 4 show a connector for a printed circuit board according to the first embodiment. This connector connects a printed circuit board P built in a portable telephone and an SIM card C of GSM standard that stores, for example, personal data. It is a board to card connector.

In these diagrams, 1 denotes a board-shaped housing made of an insulating material, for example, a heat resistant resin or the like. This housing is provided with a total of six windows 2, two rows×three columns. In each window 2, a connecting terminal 3 is provided. The connecting terminal is made of, for example, a copper alloy, and is given gold plating, etc. when necessary. This connecting terminal 3 has an intermediate part 3a that is fixed to a housing part 1a at the edge of the window. The internal end of the connecting terminal 3 is bent into an inverted V shape in the window 2 to form a contacting part 3b. The external end of the terminal 3 extends out of the housing 1 to form a lead 3c. With this configuration, the contacting part 3b can undergo elastic deformation in the direction of thickness of the housing (the vertical direction in FIG. 1) through elastic deformations of a cantilever part of the terminal 3 protruding from the housing part 1a and the inverted—V-shaped portion. The external end of the connecting terminal 3 is formed into the lead 3c, and when the connector is placed on the printed circuit board, the lead 3c is substantially coplanar with the bottom of the housing 1 and almost contacts the printed circuit board. The shape of the lead 3c may be any of so-called gull wing type, bat lead type, J-bend type and other types.

The above-mentioned connecting terminal 3 is integrally provided with reinforcing leads 3d, 3d that extend from the intermediate part 3a toward the bottom of the housing in the window 2. When the connector is placed on the printed circuit board, these reinforcing leads 3d, 3d are almost coplanar with the bottom of the housing 1 and almost contact the printed circuit board P. This reinforcing lead 3d may be soldered onto the printed circuit board P, and in this case, the strength of fixation of the connector onto the printed circuit board P is increased. Moreover, as the top ends of the reinforcing leads 3d, 3d are located in the window 2, heating can be done easily when reflow soldering is used, and reliable fixation can be accomplished. When seen in a plan view, these reinforcing leads 3d. 3d are arranged almost symmetrically on both sides of the connecting terminal's part extending towards the contacting part 3b. This arrangement is desirable because the pressing force exerted to the contacting part 3b by an SIM card C is balanced with the reactions exerted onto the two reinforcing leads 3d, 3d by the printed circuit board P. This arrangement, however, is discretionary. The number and arrangement of reinforcing lead 3d formed on one connecting terminal are also discretionary.

Figure 5:
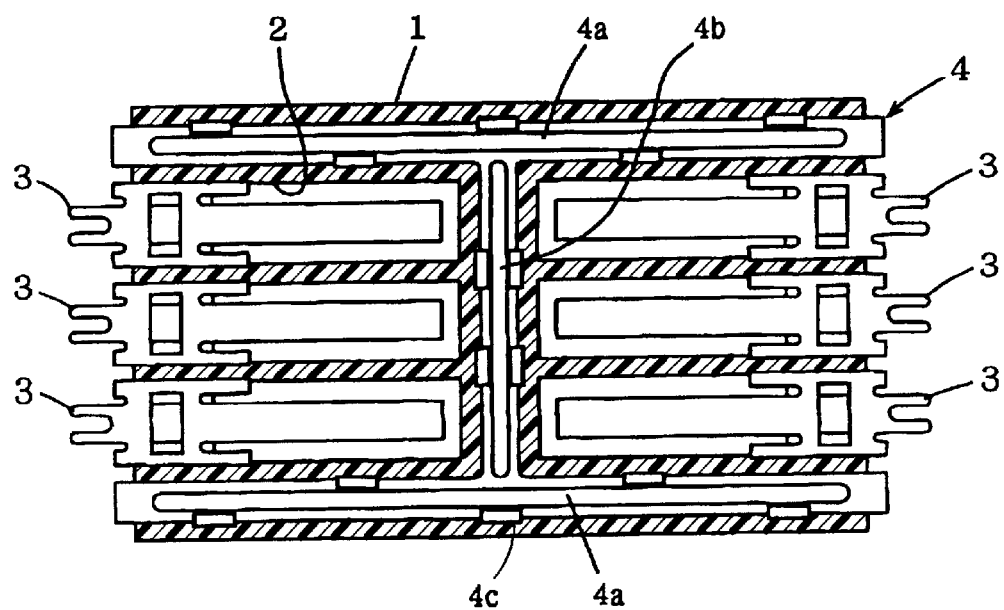
FIG. 5 is a transverse sectional view of the first embodiment.

As shown in FIG. 5, a reinforcing frame 4 is embedded in the housing 1 of the above-mentioned connector. This frame 4 comprises transverse frames 4a, 4a that are embedded along sides from which no leads 3c of the connecting terminals 3 are protruding and a longitudinal frame 4b that is embedded in a central portion of the housing 1 between opposing windows 2 and connects the above-mentioned transverse frames 4a, 4a. If necessary, the transverse frames and the longitudinal frame are provided with a reinforcing rib. Moreover, if necessary, fixing parts 4c are formed and they are fixed onto the resin of the housing 1.

The above-mentioned connector is surface-mounted, by the leads 3c, on a printed circuit board P built in a portable telephone. When an SIM card C is inserted into the portable telephone, the contacting parts 3b undergo elastic deformation to press against and contact the contacting parts of the SIM card C and make board to board or board to card mechanical connection and electric connection. Now, structures for fitting the SIM card C into and removing the card C from the portable telephone will be described by example. In one type, the SIM card C is inserted into a slot formed in the portable telephone to bring the SIM card C to a position approximately in parallel with the printed circuit board P. In another type, a cover of the housing of the portable telephone is lifted to expose the contacting parts and nearby area of the printed circuit board P, then the SIM card is placed there and the cover is closed to bring th SIN card C into a position in parallel with the printed circuit board P. In the former type, the SIM card C contacts the contacting parts 3b of the connector and pushes them into the inner side of the windows 2 to slide into the slot. When the SIM card C reaches the fully inserted position, the contacting parts of the SIM card C contact and press the contacting parts 3b of the connector. In the latter type, when the contacting parts of the SIM card C are in contact with the contacting parts 3b of the connector, the closing force of the cover is used to press the contacting parts of the SIM card C against the contacting parts 3b of the connector.

Figure 6:
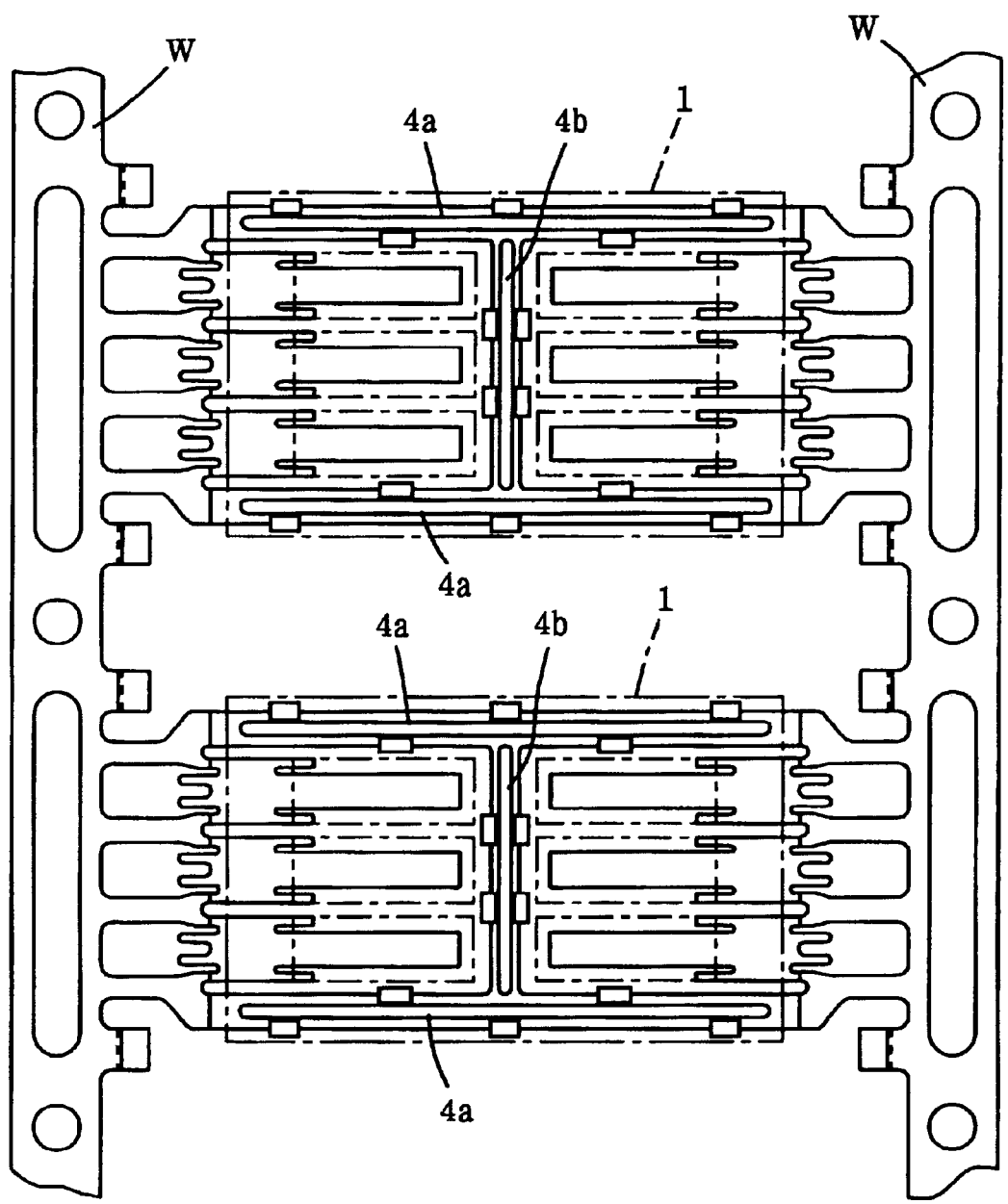
FIG. 6 is a reduced plan view showing the production method of the first embodiment.

Next, a production method of the above-mentioned connector will be described. First, as shown in FIG. 6, connecting terminals 3 and a frame 4 being connected together as a single piece are press-formed from a plate material W (illustrated by solid line in the diagram). Next, the above-mentioned connecting terminals 3 and frame 4 are placed in a mold and a housing 1 is molded (illustrated by dashed ghost line in the diagram). After that, the connecting terminals 3 and frame 4 are cut away from the remnants of the plate W. This completes the production. FIG. 6 shows a case in which plural connectors are produced at a time from a single plate material W. The number of connectors to be produced at a time is discretionary.

Figure 7:
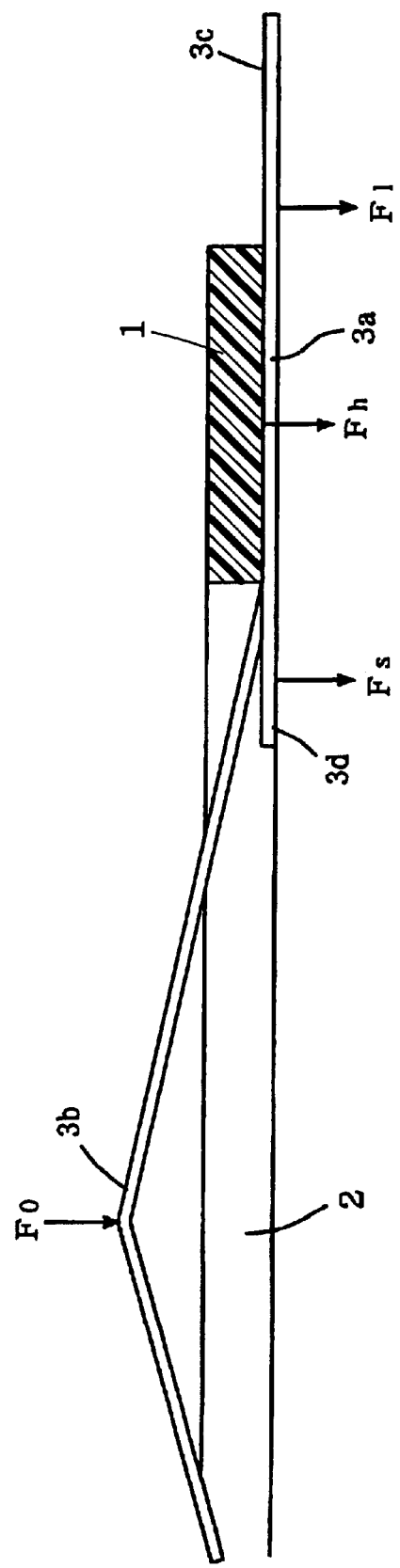
FIG. 7 is an enlarged sectional view around a connecting terminal of the first embodiment.

In the present first embodiment, as shown in FIG. 7, a pressing contact force Fo exerted by the counterpart SIM card C is transmitted by the connecting terminal 3 to work on fixed parts or contact parts of the lead 3c and the housing 1 on the printed circuit board as Fl and Fh, respectively, and moreover, Fo also works on a fixed part or a contact part of the reinforcing lead 3d on the printed circuit board P as Fs. The concentrated stresses on the lead 3c and the housing 1 are reduced by that diverted amount. This prevents damages to the lead 3c and allows reduction in its size and thickness, and in turn allows reduction in size and thickness of the housing 1.

Now, when the contacting parts of all the leads against a printed circuit board are in a single plane, this state is expressed by "A good coplanarity is obtained." When the connecting terminals are to be supported on a printed circuit board by reinforcing leads as well as leads, all the leads and reinforcing leads must have a high coplanarity. Otherwise, the reinforcing leads cannot fully exhibit their function of reducing the concentrated stresses on the leads and the housing. However, when the reinforcing frame 4 is embedded in the housing 1 of the connector, as is the case of the above-mentioned embodiment, any deformation of the housing 1 is reliably prevented by the reinforcing function of the frame 4, and a high coplanarity is obtained for all the leads 3c and reinforcing leads 3d. As a result, concentrated stresses on the leads 3c and the housing 1 are reliably reduced.

Moreover, according to the above-mentioned production method, as the connecting terminals 3 and frame 4 being integrally connected to the plate W are buried into the housing 1, more higher coplanarity is obtained for all the leads 3c and reinforcing leads 3d. Thus the concentrated stresses on the leads 3c and the housing are reliably reduced. Moreover, the connecting terminals 3 and the frame 4 can be set into a mold by a single action. This facilitates setup.

Figure 8:
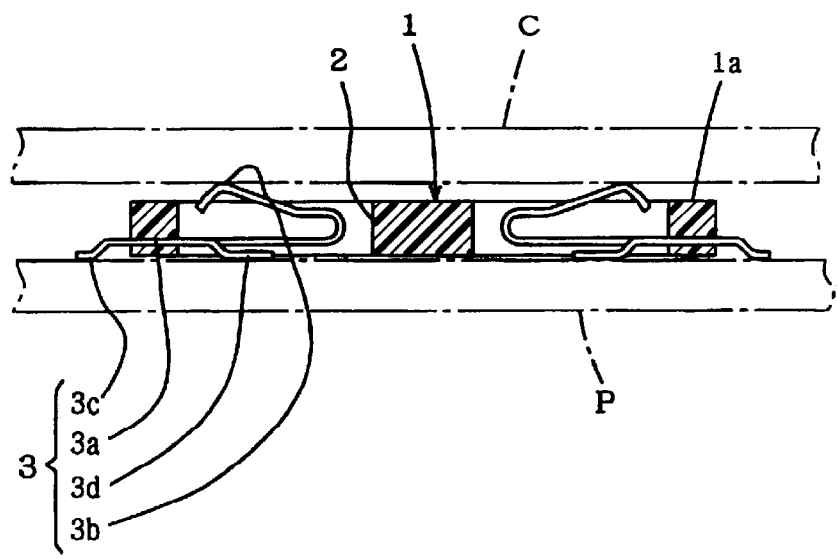
FIG. 8 is a diagram of the second embodiment and a counterpart of FIG. 1.

FIG. 8 shows a second embodiment that differs from the first embodiment in only the configuration of the contacting part and nearby portions of each connecting terminal 3. In the second embodiment, connecting terminals 3 are of so-called bellows type. The internal end of the connecting terminal 3 bends upward into an approximately U shape in the window 2 and further bends into an approximately inverted V form to form a contacting part 3b. With this configuration, the contacting part 3b can undergo elastic deformation in the direction of thickness of the housing (the vertical direction in FIG. 8) through elastic deformations of a cantilever part of the connecting terminal 3 extending from the housing part 1a and the U-shaped bent portion. Since the other configurations, operations and effects are completely identical to those of the first embodiment, the identical reference characters are used and the description of the first embodiment applies here as well in its entirety.

Figure 9:
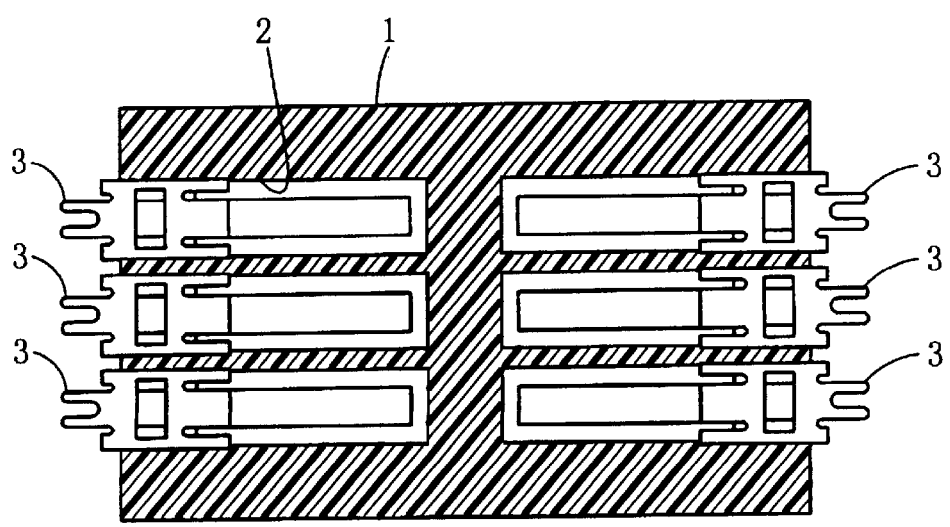
FIG. 9 is a diagram of an embodiment wherein no frame is embedded, and is a counterpart of FIG. 5.
Figure 10A:
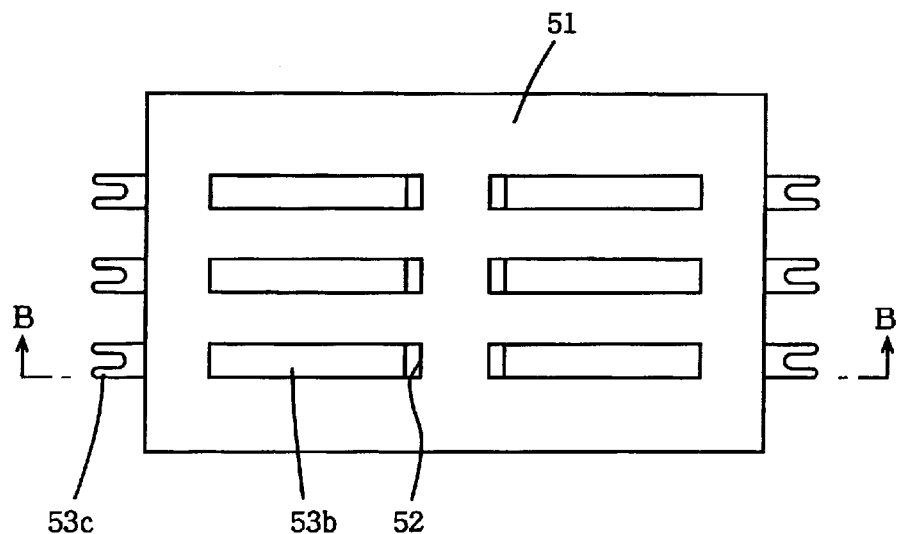
FIG. 10A is a plan view showing a conventional connector.
Figure 10B:
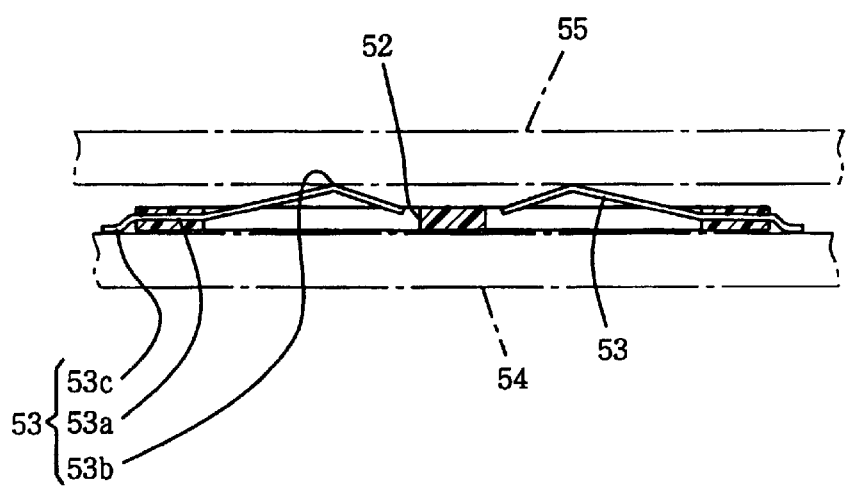
FIG. 10B is a sectional view along the line B—B of FIG. 10A.

The present invention includes an embodiment wherein no frame is embedded as shown in FIG. 9. This embodiment comprises a board-shaped housing 1 with windows 2 and connecting terminals 3 being arranged in relation to the windows 2, and each connecting terminal 3 has an intermediate part that is fixed to the housing part near the edge of the window, a contacting part that is formed at the inner end so that it can undergo elastic deformation in the direction of thickness of the housing in the window 2 near the top of the housing, a lead formed at the external end, and a reinforcing lead that extends from the intermediate part toward the bottom of the housing in the window 2. In this embodiment, the pressing contact forces that are exerted by the counterpart SIM card work, via the connecting terminals 3, on the fixed parts or contact parts of the leads and the housing 1 on a printed circuit board. The pressing contact forces also work on the fixed parts or contact parts of the reinforcing leads on the printed circuit board, and by that portion, the concentrated stresses on the leads and the housing 1 are reduced. This prevents damages to the leads, making it possible to reduce size or thickness of the leads, and in turn, to reduce size or thickness of the housing 1.

In the above-mentioned embodiments, the number of the windows and the number of the connecting terminals are a total of six, 2 rows×3 columns. This, however, does not limit the number of the windows, the number of the terminals and their arrangement. The configuration of a portion of the connecting terminal near its contacting part is not limited to the type exemplified in the above-mentioned embodiments; the present invention is applicable when the contacting part is arranged so that it can undergo elastic deformation in the direction of thickness of the housing in the window near the top of the housing. When a frame is embedded, as is the case of the above-mentioned first embodiment, the configuration of the frame is not limited to the above-mentioned embodiments. The present invention is applicable when a heat-resistant frame of a discretionary form having a function of reinforcing the housing is embedded in the housing. With regard to the structure of fixing of the intermediate part 3a of the connecting terminal 3 to the housing part 1a, the present invention is applicable to a connector of which connecting terminal has, as shown in the first embodiment, a structure wherein the upper face of the intermediate part 3a is jointed to the bottom of the housing part 1a (including, for example, a structure wherein the bottom of the housing part 1a is hooked by a hole formed in the intermediate part 3a or a periphery thereof to hold the intermediate part 3a, and a structure wherein the upper face of the intermediate part 3a is bonded onto the bottom of the housing part 1a), or, as shown in the second embodiment, a structure wherein the intermediate part 3a is embedded in the housing part 1a. Furthermore, in the above-mentioned embodiments, board to card connection is exemplified by connection between a printed circuit board P and an SIM card C. The present invention, however, is extensively applicable to board to board connection or board to card connection in a variety of appliances. Such cards include not only SIM cards but also PC cards, IC cards and the like. Counterparts of connection include printed circuit boards, SIM cards and the like, and battery packs; in short, all media that require mechanical connection and electric connection with a printed circuit board at connecting parts are included.

What is claimed is:

1. A combination of a connector in combination with and soldered to a printed circuit board, said connector comprising:
  a board-shaped housing having a plurality of windows therein, and
  a plurality of connecting terminals, with a respective one of said connecting terminals arranged respectively corresponding to and in relation to each one of said windows,
  wherein each one of said connecting terminals respectively includes:
    an intermediate part fixed by molding to a part of said housing at an outer edge of a respective associated one of said windows,
    a contacting part that extends from said intermediate part into said associated window, and that is formed so as to be able to undergo elastic deformation in a direction of thickness of said housing in said window near a top of said housing,
    a connecting lead that extends from said intermediate part outwardly away from said window, and
    a reinforcing lead that extends from said intermediate part toward and into said window at a bottom of said housing.

2. The combination of said connector and said printed circuit board of claim 1, further comprising a reinforcing frame embedded in said housing.

3. The combination of said connector and said printed circuit board of claim 2, wherein each said reinforcing lead comprises two reinforcing lead parts that are arranged almost symmetrically on both sides of said contacting part of each respective one of said connecting terminals, and said reinforcing lead parts are in contact with said printed circuit board.

4. The combination of said connector and said printed circuit board of claim 1, wherein each said reinforcing lead comprises two reinforcing lead parts that are arranged almost symmetrically on both sides of said contacting part of each respective one of said connecting terminals, as seen in a plan view, and said reinforcing lead parts are in contact with said printed circuit board.

5. A production method for producing said combination of said connector and said printed circuit board of claim 2, said method comprising:
  a step of press-forming said connecting terminals and said reinforcing frame being connected together as integral parts of a single piece,
  a subsequent step of placing said connecting terminals and said frame in a mold and molding a housing, and
  a further subsequent step of disconnecting said connecting terminals and said frame from a remainder of said single piece.

* * * * *